United States Patent
Yagil et al.

(10) Patent No.: US 6,732,315 B2
(45) Date of Patent: May 4, 2004

(54) HOME NETWORKING OVER PHONE LINES

(75) Inventors: Ariel Yagil, Romat-Hasahron (IL); Mati Amit, Zur-Yigal (IL); Ofir Shalvi, Herzlia (IL)

(73) Assignee: Texas Instruments Incorporated, Dallas, TX (US)

( * ) Notice: Subject to any disclaimer, the term of this patent is extended or adjusted under 35 U.S.C. 154(b) by 540 days.

(21) Appl. No.: 09/774,543

(22) Filed: Jan. 31, 2001

(65) Prior Publication Data

US 2002/0019966 A1 Feb. 14, 2002

Related U.S. Application Data

(60) Provisional application No. 60/178,969, filed on Jan. 31, 2000.

(51) Int. Cl.[7] .............. H03M 13/29; H03M 13/25; H04M 11/06
(52) U.S. Cl. .................... 714/755; 379/93.06
(58) Field of Search ............ 714/755; 379/93.06

(56) References Cited

U.S. PATENT DOCUMENTS

| | | | | |
|---|---|---|---|---|
| 3,831,143 A | * | 8/1974 | Trafton ............... | 714/755 |
| 4,907,233 A | * | 3/1990 | Deutsch et al. ........ | 714/755 |
| 5,081,649 A | | 1/1992 | Kennard | |
| 5,127,090 A | | 6/1992 | Ruehle et al. | |
| 5,351,272 A | | 9/1994 | Abraham | |
| 5,363,408 A | | 11/1994 | Paik et al. | |
| 5,493,586 A | * | 2/1996 | Brownlie et al. ....... | 375/265 |
| 5,539,744 A | | 7/1996 | Chu et al. | |
| 5,673,290 A | | 9/1997 | Cioffi | |
| 5,841,378 A | * | 11/1998 | Klayman et al. ........ | 341/61 |
| 5,883,907 A | | 3/1999 | Hoekstra | |
| 5,889,861 A | | 3/1999 | Ohashi et al. | |
| 5,892,766 A | | 4/1999 | Wicki et al. | |
| 5,896,443 A | * | 4/1999 | Dichter ............. | 379/93.08 |
| 5,917,809 A | | 6/1999 | Ribner et al. | |
| 5,983,101 A | | 11/1999 | Billstrom | |
| 6,351,832 B1 | * | 2/2002 | Wei ................. | 714/755 |
| 6,529,549 B1 | * | 3/2003 | Norrell et al. ........ | 375/229 |
| 6,553,098 B1 | * | 4/2003 | Harrison et al. ...... | 379/22.03 |
| 6,563,816 B1 | * | 5/2003 | Nodoushani et al. .... | 370/352 |
| 6,611,940 B1 | * | 8/2003 | Markarian et al. ..... | 714/755 |

OTHER PUBLICATIONS

Anonymous, HomePNA Specification 1.0 Field Tests Status, Mar. 1999, Home Phoneline Networking Alliance, Inc, pp. 1–6 (copy found at http://www.homepna.org/docs/Field-tri.pdf).*

* cited by examiner

*Primary Examiner*—R. Stephen Dildine
(74) *Attorney, Agent, or Firm*—Wade James Brady, III; Frederick J. Telecky, Jr.

(57) ABSTRACT

A home networking transmitter (100), receiver (200), station (300), network manager (404), network (400) and method adapted to network devices (344/336/338/346) over phone lines (406) in a home. A bandwidth other than the 4 to 10 MHz band defined in the HomePNA 2.0× specification and a Baud rate higher than 4M baud may be used for communications between a plurality of devices (334/336/338/346). PHY and MAC layers are improved to increase the performance of home phone line networks. Advantages in the PHY layer include numerous higher symbol rates, higher constellations, variable power level, error correcting codes, byte interleaving, ISI-free pulse shape and pre-equalization. Advantages in the MAC layer include managed bandwidth resources allocation, guaranteed quality of service for latency sensitive applications, solicited grants, support to devices with low power consumption and support to device with low processing power.

10 Claims, 3 Drawing Sheets

INPUT SEQUENCE: $C_1(1),...C_1(Nr),C_2(1),...C_2(Nr),C_3(1)...C_{i'}(1)...C_{i'}(N')$
OUTPUT SEQUENCE:
$C_1(1),C_2(1)...C_{i'}(1),C_1(2)...C_{i'}(2)...C_1(N')...C_{i'}(N'),C_1(N'+1)...C_{i'-1}(N'+1),C_1(N'+2)...$
$C_{i'-1}(N'+2)...C_1(Nr)...C_{i'-1}(Nr)$

HOME NETWORKING OVER PHONE LINES

CROSS REFERENCE TO RELATED APPLICATIONS

This application claims priority under 35 USC § 119(e)(1) of provisional application No. 60/178,969, filed Jan. 31, 2000, entitled "Home Networking Systems."

The following U.S. patent is commonly assigned and is hereby incorporated herein by reference: U.S. Pat. No. 6,337,632, filed on Dec. 28, 1999 by Ariel Yagil, entitled "A Method for Efficient Interleaving of Variable Length Packets With Maximized Block Size."

TECHNICAL FIELD OF THE INVENTION

This invention relates generally to communication systems, and more particularly to networking devices in a home over phone lines.

BACKGROUND OF THE INVENTION

Home Phoneline Network Alliance (HomePNA) standards 1.0 and 2.0, incorporated herein by reference, have become the dominant solutions for home networking. These standards utilize the existing phone line wires in the homes. HomePNA 1.0 provides a throughput of 1 Mbps, while HomePNA 2.0x typically provides 10 Mbps, or up to 16 Mbps in good channels, and optionally up to 32 Mbps, which is comparable to Ethernet 10BaseT. However, the ever-growing needs for higher throughput and quality of service (QoS) call for the definition of an improved standard.

SUMMARY OF THE INVENTION

The present invention achieves technical advantages by providing improved physical (PHY) and Media Access Control (MAC) layers to increase the performance of home phone line networks. The PHY improvements include numerous higher symbol rates, higher constellations, variable power level, error correcting codes, byte interleaving, inter-symbol-interference (ISI)-free pulse shape and pre-equalization. The MAC improvements include managed bandwidth resources allocation, guaranteed quality of service for latency sensitive applications, solicited grants, support to devices with low power consumption and support to device with low processing power.

Some of the advantages of the present improved home networking system include utilizing extended spectral bands, increased transmission power and others. The present home networking system is especially suitable for homes where the phone wires are isolated from the public network, which allows relaxation of restrictions. The above features provide a significant improvement in the home network throughput, robustness and QoS. Therefore, it allows home phone line networks to support applications that require higher throughput and better QoS, such as audio, video, games, client/server, distributed computing and future applications.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

The current HomePNA standards do not provide enough throughput and QoS for many applications that are desirable in home networking, such as video and gaming, as examples. The current invention includes a set of PHY and MAC improvements to the current HomePNA 2.0, 2.01 and 2.02 standards (referred to herein collectively as HomePNA 2.0x) that provide a significantly higher throughput and QoS.

Figure 1:
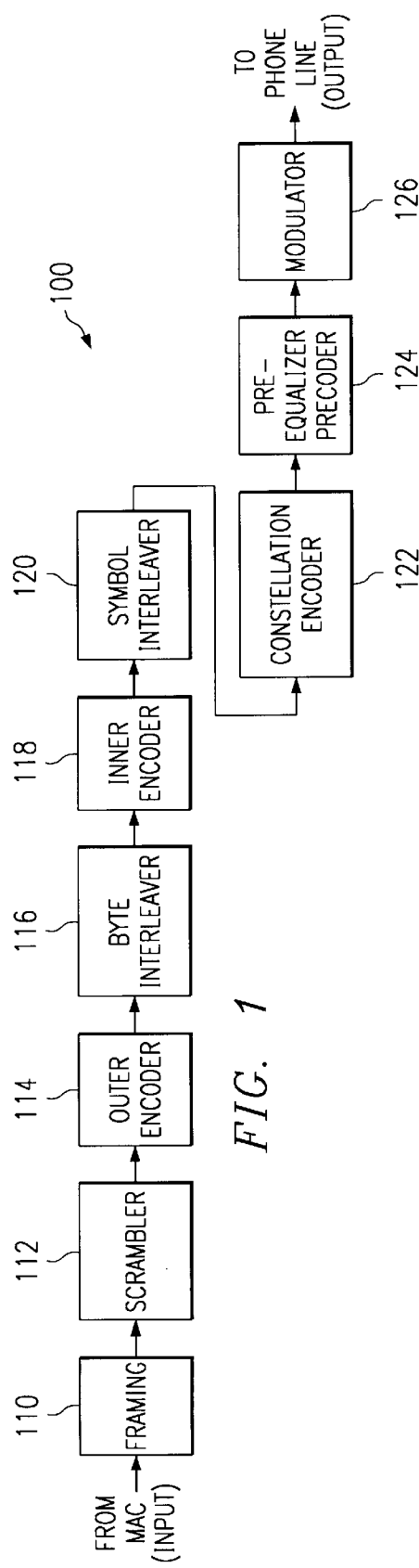
FIG. 1 depicts a general structure of the home phone networking (HomePN) transmitter of the present invention.

The general structure of a home phone networking (HomePN) transmitter 100 of the present invention is shown in FIG. 1. An embodiment of the present invention may include some or all elements 110, 112, 114, 116, 118, 120, 122, 124, and 126, for example.

The input of a framing unit 110 is coupled to an input of the HomePN transmitter 100. The transmitter 100 input is coupled to the MAC unit 350 of the HomePN station (of FIG. 3, to be described further herein), to network a plurality of devices 334/336/338/346.

The framing unit 110 preferably comprises an extended version of HomePNA 2.0x framing unit and is adapted to organize the incoming packets in the appropriate format, e.g., to add a header that comprises a preamble and control information, and to add an end-of-frame (EOF) delimiter, as examples. When the embodiment of the invention is backward compatible with HomePNA 2.0x stations, the framing unit 110 must include HomePNA 2.0x framing capabilities. For granted bursts, when a network manager is present, as described later herein, or when backward compatibility is not required, different framing can be used in order to reduce burst overhead. The output of framing unit 110 is coupled to the input of scrambler 112. The scrambler 112 preferably comprises a HomePNA 2.0x scrambler. When the embodiment of the invention is backward compatible with Home-PNA 2.0x stations, the scrambler must include HomePNA 2.0x scrambling capabilities.

The output of scrambler 112 is coupled to the input of outer encoder 114. The outer encoder 114 preferably comprises an error correcting encoder, such as Reed-Solomon (RS) code, that is activated to support the home network systems of the present invention. Outer encoder 114 allows better robustness against channel impairments such as stationary and non-stationary (impulse and burst) noise.

The output of the outer encoder 114 is coupled to the input of a byte interleaver 116. The term "byte" herein does not necessarily refer to a character comprising of 8 bits, but to a character from the alphabet of the outer code. For example, if the outer code is RS code over Galois field with 128 elements, a byte comprises 7 bits. The byte interleaver 116 comprises a device that performs permutations on the bytes of the transmitted packets, which allows spreading of error bursts at the input of the outer code decoder 214 at the receiving station 200 (of FIG. 2, to be described further herein.) Preferably, the byte interleaver 116 comprises a dynamic block interleaver.

However, the byte interleaver 116 may comprise any interleaver, such as a fixed block interleaver, convolutional interleaver and others, as examples.

The output of the byte interleaver 116 is coupled to the input of an inner encoder 118 that is adapted to provide additional coding gain for high-throughput applications. The inner encoder 118 may comprise any error correction code such as convolutional code, block code, bit-interleaved-coded-modulation, trellis-coded-modulation (TCM), pragmatic TCM, Turbo-TCM, Turbo Product Code (TPC) or others. The preferred embodiment of the invention includes Turbo-TCM or TPC that can achieve nearly theoretical performance.

The output of inner encoder 118 is coupled to the input of symbol interleaver 120. The symbol interleaver 120 is adapted to perform permutations on the symbols of the transmitted packets, which allows spreading of error bursts at the input of the inner code decoder 214 at the receiving station 200. Preferably, the symbol interleaver 120 comprises a dynamic block interleaver, although other interleavers, such as fixed block interleavers and convolutional interleavers, as examples, may be used.

The output of symbol interleaver 120 is coupled to the input of constellation encoder 122. The constellation encoder 122 preferably comprises an extended version of a HomePNA 2.0× constellation encoder that allows higher constellations 512 Quadrature Amplitude Modulation (QAM) and 1024 QAM, as examples.

The output of constellation encoder 122 is coupled to the input of pre-equalizer/precoder 124. The pre-equalizer/precoder 124 allows compensating for channel reflections at the transmitter. A pre-equalizer or a precoder, or both may be used. A pre-equalizer 124 is a device comprising a Finite-Impulse-Response (FIR) filter with programmable coefficients that are determined by the receiving station 200.

These coefficients are transmitted from the receiving station 200. A precoder is a device comprising an Infinite-Impulse-Response (IIR) filter with programmable coefficients and a non-linear device that guarantees bounded amplitude. There are many known precoders that may be used for pre-equalizer/precoder 124, such as a Tomlinson-Harashima (TH) precoder, and a Laroia precoder, as examples.

Figure 2:
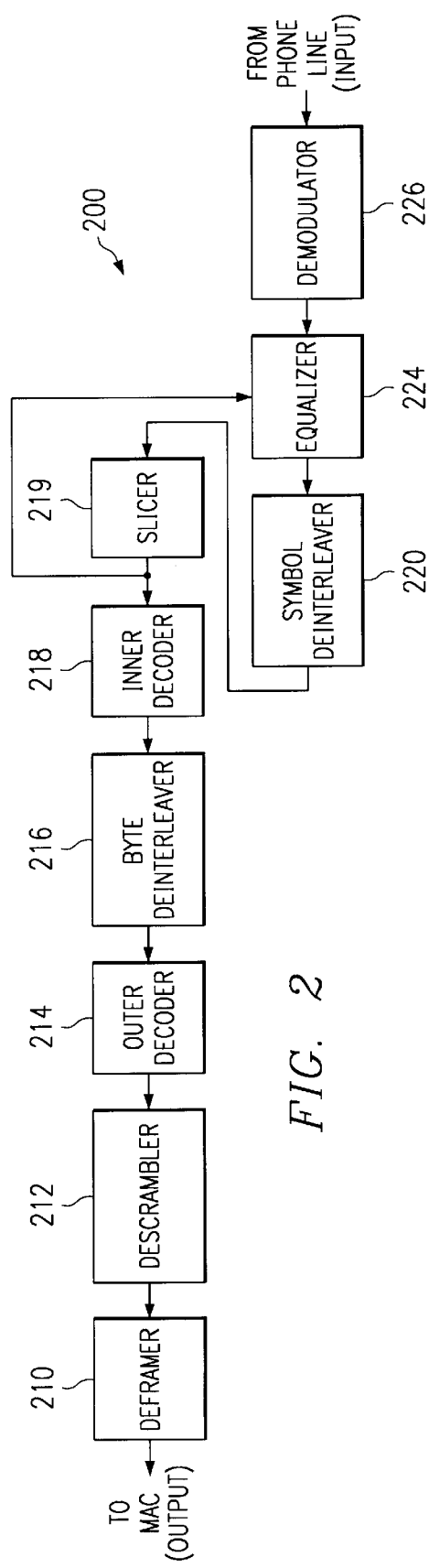
FIG. 2 illustrates the general structure of a HomePN receiver in accordance with the present invention.
Figure 3:
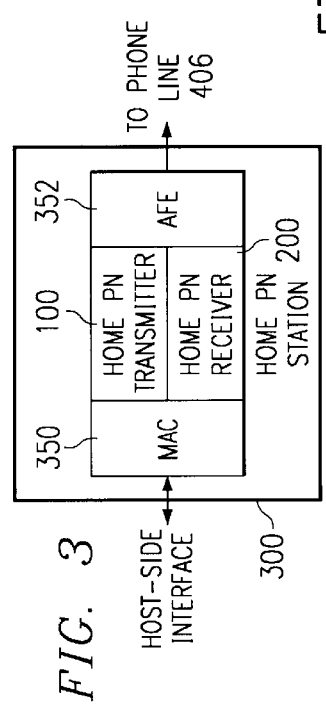
FIG. 3 shows a HomePN station including a HomePN transmitter and HomePN receiver.

The output of pre-equalizer/precoder 124 is coupled to the input of modulator 126. The modulator 126 is preferably an extended version of HomePNA 2.0× that allows for more Baud rates and frequency bands, and possibly additional pulse shapes, such as Square-Root Raised Cosine (SQRRC), as an example. Some of the benefits of the new modes are achieved by exploiting the new home environment of a residential gateway that may induce less restriction on the transmitted spectral mask. The output of the modulator 126 is coupled to the output of the HomePN transmitter 100. The output of the HomePN transmitter 100 is coupleable to a phone line 406 (FIG. 4) through an analog front end (AFE) 352 that couples the phone line to the station's transmitter output and the station's receiver input (FIG. 3.) An example of the general structure of a HomePN receiver 200 of the present invention is shown in FIG. 2. An embodiment of the HomePN receiver 200 of the present invention may include some or all elements 210, 212, 214, 216, 218, 219, 220, 224, and 226, for example.

The output of deframer 210 is coupled to an output of the HomePN receiver 200. The HomePN receiver output is coupled to the MAC unit 350 of the HomePN station (of FIG. 3).

The deframer 210 preferably comprises an extended version of HomePNA 2.0× deframing unit. The deframer 210 functionality is preferably identical to HomePNA 2.0× for non-granted bursts. When the embodiment of the invention is backward compatible with HomePNA 2.0× stations, the deframing unit 210 must include HomePNA 2.0× deframing capabilities. For granted bursts, when a network manager 404 (FIG. 4) is present, different deframing can be used in order to reduce burst overhead.

The input of deframer 210 is coupled to the output of descrambler 212. The descrambler 212 preferably comprises a HomePNA 2.0× descrambler. When the embodiment of the invention is backward compatible with HomePNA 2.0× stations, the descrambler 212 must include HomePNA 2.0× descrambling capabilities.

The input of descrambler 212 is coupled to the output of outer decoder 214. The outer decoder 214 preferably comprises an error correcting decoder, such as a Reed-Solomon code (RS) decoder that is activated to support the home network systems of the present invention. Outer decoder 214 allows better robustness against channel impairments such as stationary and non-stationary (impulse and burst) noise.

The input of the outer decoder 214 is coupled to the output of a byte de-interleaver 216. The byte de-interleaver 216 is adapted to allow spreading of error bursts at the input of the outer code decoder 214. Preferably, the byte de-interleaver 216 comprises a dynamic block de-interleaver. However, the byte de-interleaver 216 may comprise any de-interleaver, such as a fixed block de-interleaver, convolutional de-interleaver and others, as examples.

The input of byte interleaver 216 is coupled to the output of an inner decoder 218 that is adapted to provide additional coding gain for high-throughput applications. The inner decoder 218 may comprise any error correction code such as convolutional code, block code, bit-interleaved-coded-modulation, TCM, pragmatic TCM, Turbo-TCM, TPC or others. A preferred embodiment of the invention includes Turbo-TCM or TPC that achieve nearly theoretical performance. When soft decision decoding is used, the inner decoder 218 unit may include a demapper, not shown, and these functions may be performed at the same time, for example.

The input of the byte inner decoder 218 is coupled to the output of a slicer 219 that comprises a device adapted to determine on which constellation point was most likely transmitted, and translate it to received bits accordingly. Slicer 219 output is also fed back to equalizer 224.

The input of slicer 219 is coupled to the output of symbol de-interleaver 220. The symbol de-interleaver 220 is adapted to perform permutations on the incoming symbol-stream, which allow spreading of error bursts at the input of the inner code decoder 218. Preferably, the symbol de-interleaver 220 comprises a dynamic block de-interleaver, although other de-interleavers, such as fixed block de-interleavers and convolutional de-interleavers, as examples, may be used.

The input of symbol de-interleaver 220 is coupled to the output of equalizer 224. The equalizer 224 preferably comprises an adaptive Decision Feedback Equalizer (DFE) and is adapted to adaptively compensate for channel reflections.

The input of equalizer 224 is coupled to the output of demodulator 226. The equalizer 224 may also be coupled to the output of the slicer 219. The demodulator 226 is preferably an extended version of HomePNA 2.0x that allows for more Baud rates and frequency bands, and possibly additional pulse shapes, such as SQRRC, as an example. Some of the benefits of the new modes are achieved by exploiting the new home environment of a residential gateway that may induce less restriction on the transmitted spectral mask.

The input of demodulator 226 is coupled to the input of the receiver 200. The HomePN receiver 200 input is coupleable to a phone line 406 (of FIG. 4) through an AFE 352 that couples the phone line to the station's transmitter output and the station's receiver input (FIG. 3).

FIG. 3 shows a HomePN station 300 including a HomePN transmitter 100, HomePN receiver 200, a MAC unit 350 and an AFE 352. Transmitter 100 and receiver 200 are coupled together to the phone line through the AFE 320. Transmitter 100 and receiver 200 are also coupled to the MAC unit 350. The MAC unit 350 is coupleable to a device such as a PC 334, digital TV 336, DVD 338, printer 346 (FIG. 4), for example, in a home 408 through a host-side interface that preferably comprises a Ethernet media independent interface (MII), but may comprise other interfaces such as a Peripheral Component Interconnect (PCI) bus, for example. AFE 352 is coupled to a phone line 406 for networking to other HomePN stations 300 and to a network manager 404, if a network manager 404 is utilized in the network 400 (FIG. 4).

Figure 4:
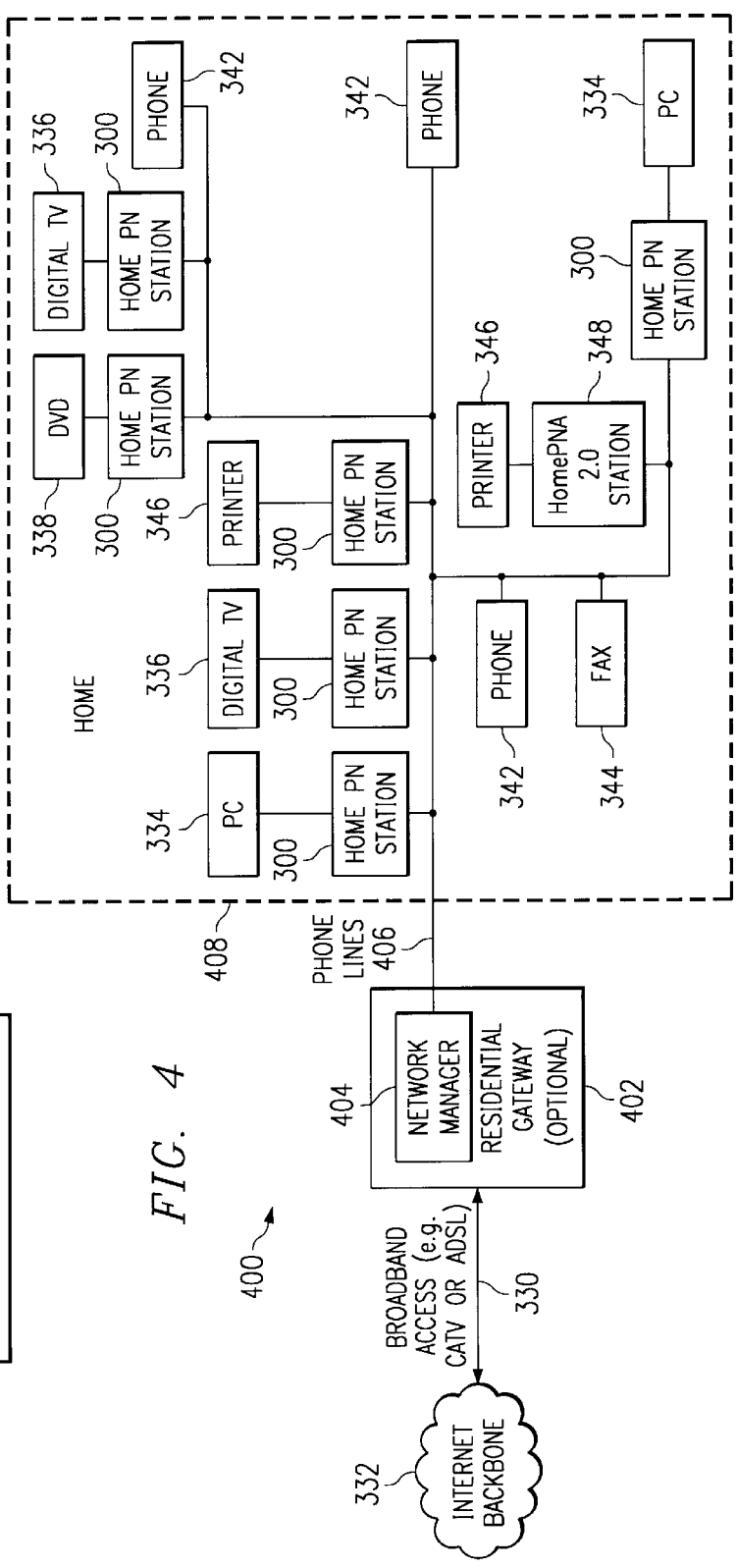
FIG. 4 shows an example of a network utilizing the present HomePN invention having a network manager and a HomePN station for each device in the network.

FIG. 4 shows an example of a network 400 utilizing the present HomePN invention having a network manager 404 and a HomePN station 300 for each device 334/336/338 in the network 400. HomePN stations 300 are coupled at one end to a plurality of devices which may comprise PCs 334, digital TVs 336, DVDs 338, and printers 346, for example, in a home 408. HomePN stations 300 are coupled at the other end to the home phone line 406. The phone line 406 and HomePN stations 300 are adapted to couple the various devices 334/336/338/346 together to form a network 400. Phones 342 are also coupled to the phone line 406 but utilize a different frequency spectrum than the home network devices 300/334/336/338/346.

In an embodiment of the present invention, legacy Home-PNA 2.0x stations 348 are inter-operable with the novel home network 400 described herein. For example, Home-PNA 2.0x stations 348 may be adapted to couple a device such as a printer 346 to the phone line 406 and provide communication between the printer 346 and the PCs 334 of the home network 400.

An optional residential gateway 402 may be coupled between the phone line 406 and a broadband access 330 e.g. via CATV or ADSL, to the Internet backbone 332, for example. The residential gateway 402 may include a network manager 404 in accordance with an embodiment of the present invention, the network manager 404 being adapted to allocate channel resources for the home 408 network 400. Alternatively, the network manager 404 may reside in another location within the network 400, e.g., within a PC 334, digital TV 336 or other networked home devices, as examples.

Although the term "home" shown at 408 in FIG. 4 is described herein as being a single residence, it is anticipated that the home network 400 and HomePN devices 100/200/ 300/404 disclosed herein are beneficial in networking environments having close proximity in a relatively small physical scale, such as a multi-family dwelling or in an office, for example. The use of the term "home" is intended to encompass these networking applications.

In the prior art HomePNA 2.0x specification, a frequency band of 4 MHz to 10 MHz and Baud rates of 2 or 4 M Baud is used, to guarantee compatibility with other services such as Asynchronous Digital Subscriber Line (ADSL). The present invention 100 advantageously utilizes extended frequency bands according to the environment of the home network. Accordingly, higher Baud rates may be utilized when the environment allows. For example, when residential getaway systems are deployed (i.e. voice, data, video and other services are delivered to the home over Internet Protocol (IP) through broadband communications networks such as ADSL or CATV), the home wiring is isolated from the external world. In this case, for example, extended spectral bandwidth may be utilized for higher Baud rates. The extended bandwidth mode is preferably activated by the residential gateway station, which serves as the home network manger, but may be activated by any station with network manager capabilities. The allowed spectral bands should be configured into the network manager 404, which may be a fixed configuration, or programmable from the central office, for example. The actual frequency band may be determined in the rate negotiation process between each pair of stations 300 according to the capabilities of the stations and channel conditions, or by other mechanisms. For example, the frequency band may be pre-determined, determined by the network manager 404, or determined by an external manger through the Internet, as examples.

The header and EOF are preferably transmitted in a 2 Mbaud, Quadrature Phase Shift Keying (QPSK) mode for backward compatibility with HomePNA 2.0x modulator. However, alternatively, the header and EOF may be transmitted in higher symbol rate, be shortened or be discarded, to be described further herein.

The benefits of higher Baud rates in accordance with the present invention are a higher throughput, better robustness to spectral nulls and other distortion, better robustness against narrowband interference, and allowing a lower constellation, and therefore a lower power density, for a given bit rate. Furthermore, a lower power density allows using ISI-free pulse shapes, i.e. without a notch in the spectrum, that do not cause interference to wireless communications and may not violate regulations discarded, to be described further herein.

Figure 5:
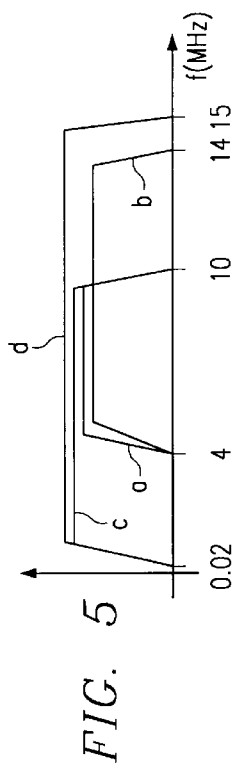
FIG. 5 depicts spectral bands of the HomePN transmitter of the present invention.

FIG. 5 illustrates example spectral bands in accordance with the present invention. In an embodiment, the same bandwidth used in the current HomePNA standards is used, identified by "a", which is 4 MHz to 10 MHz with Baud rates of 2 or 4 M Baud. In another embodiment of the present invention, a bandwidth other than 4 to 10 MHz is used. Preferred bandwidths in accordance with this embodiment include 4 MHz to 14M Hz with a Baud rate of 8 Mbaud ("b"), 20 KHz to 10 MHz with a Baud rate of 8 Mbaud ("c"), or 20 KHz–15 MHz with a Baud rate of 12 Mbaud ("d"), as examples. Bands "a" and "b" are compatible with ADSL because frequencies below 4 MHz are not utilized.

The present invention supports a variety of constellations including QPSK, 8 QAM, 16 QAM, 32 QAM, 64 QAM, 128 QAM, 256 QAM, 512 QAM and 1024 QAM, as examples. In a preferred embodiment of the present invention, all the modulations are mandatory in the transmitter, and QPSK to 256QAM are mandatory in the receiver. 512 QAM and 1024

QAM are optional in the receiver. The high constellations allow higher throughput when the signal-to-noise ratio (SNR) is good, especially when high power transmission is allowed.

In particular, an embodiment of the invention includes a transmitter 100 coupleable to a device, comprising a HomePN transmitter adapted to network the device to at least one other device over phone lines in a home at constellations greater than 8 bits per symbol. In this embodiment, the transmitter 100 preferably includes a constellation encoder 122 adapted to support the greater than 8 bit per symbol constellations. Preferably the transmitter 100 also includes a concatenation of an inner encoder 118 and an outer encoder 114, and also includes a modulator 126 adapted to support the greater than 8 bit per symbol constellations coupled to the constellation encoder 122.

The present invention may support variable transmission power density levels in the range of −85 dBm/Hz to −55 dBm/Hz, as examples. The transmitted power level may be determined in the rate negotiation process according to the capabilities of the stations, channel conditions and environmental restrictions, i.e. allowed interference to other transmissions such as ADSL, Very High Data Digital Subscriber Line (VDSL) and amateur radio, as examples. The transmitted power level may also be determined in other methods, in a similar manner to the symbol rate determination. A default power level is preferably −71.5 dBm/Hz, as in HomePNA 2.0x. Other power levels may be activated by the network manager, for example.

Variable power levels allow transmitting at the highest possible power that does not interfere with other transmissions, such as wireless transmissions, thus achieving higher throughput. Transmission in low power levels allow transmission of pulse shapes without spectral nulls, without causing interference to amateur radio signals or other transmissions. Low power level transmissions may also reduce the power consumption of the stations 300. However, in the presence of HomePNA 2.0x stations, the transmission power must be high enough to be detected by the carrier sense detector of the stations 300.

An outer code, such as a Reed-Solomon code with 118 information bytes per codeword (k) and correction factor (T) of five is presently preferred. Therefore, the codeword length in the example is 128. A shortened codeword may be used for the last codeword in the packet. Activation of the outer code may be determined in the rate negotiation process or by other mechanism, in a similar manner to the symbol rate determination. Alternatively, a variety of outer codes with different parameters, such as coding rate, may be specified. In this case, the coding parameters can be determined in the rate negotiation process according to the channel conditions.

A coding gain of a preferred embodiment of the invention (k=118, T=5) is approximately 3–4 dB or more at a bit error rate (BER) of $10^{-8}$, for example.

Therefore, there will be a significant increase in the channel throughput and robustness, thus packet loss will be decreased.

The code used by the inner encoder 118 may comprise Turbo-TCM or other codes, such as convolutional code, block code, Bit-Interleaved-Coded-Modulation (BICM), TCM, pragmatic TCM, Turbo Product Code (TPC) or others. The inner code allows a significant improvement in noise performance, especially for high data rate applications. For example, Turbo-TCM can typically add 3–4 dB coding gain. a preferred embodiment of the invention comprises Turbo-TCM or TPC that can achieve nearly theoretical performance as inner code. Activation of the inner code is determined in the rate negotiation process or by other methods.

In an embodiment of the present invention, the inner code may be concatenated with the outer code, for example. This novel concatenation approach has not been implemented heretofore in home networking over phone lines. In the prior art, two encoders were not used to network devices over a phone line. Concatenating two encoders 114/118 is beneficial because it provides increased robustness.

Concatenation of two codes may be very effective against a mixture of random error and bursts, especially when the outer code is a non-binary code such as RS code, for example. A preferred example of concatenation is using a Turbo-TCM encoder for the inner encoder 118 and a Reed-Solomon encoder for the outer encoder 114. When two encoders 114 and 118 are concatenated in the transmitter 100, preferably the transmitter includes a byte interleaver 116 between them.

In the present invention, granted packets can be transmitted with pulse shapes that allow ISI-free transmission such as SQRRC, as example. The term "ISI-free pulse shape" is defined herein as a pulse shape that is designed such that when convoloved with its matched filter, it produces a pulse shape that meets Nyquist-1 criterion. Therefore, the reception is ISI-free for a flat channel. The term "ISI-free pulse shape" also includes pulse shapes that are approximations of such a pulse shape.

In HomePNA 2.0x, ISI-free transmission was not possible for two reasons. First, there are notches in the spectral mask of the HomePNA 2.0x transmission. The purpose of these notches is to avoid causing interference in amateur radio (HAM) bands. It is well known that a pulse shape with a notch in its spectrum cannot be ISI-free as it does not meet the Nyquist-1 criterion. However, in some environments, for example, networks that are disconnected from the Public Switched Telephone Network (PSTN), or in low-power transmission that does not interfere to HAM radio, the spectral notches are not required.

Second, in HomePNA 2.0x, the symbol pulse shape mask has a very short rise time, which allows for accurate estimation of the transmission start time, which is essential for the operation of HomePNA 2.0x MAC. However, ISI-free pulse shapes typically have slow rise time so they cannot meet this requirement. However, when transmission times are granted by a network manager 404, the fast rise time of the pulse shape is no longer required, because carrier sense timing does not have to be accurate.

Therefore, in accordance with the present invention, granted packets may have SQRRC pulse shape or other ISI-free pulse shape, if the network environment allows. Therefore, an ISI-free pulse shape allows matched filtering in the receiver 200 and a significant decrease in ISI at the receiving station 200. Therefore, an ISI-free pulse shape can significantly decrease the error propagation in the receiver 202 DFE.

Figure 6:
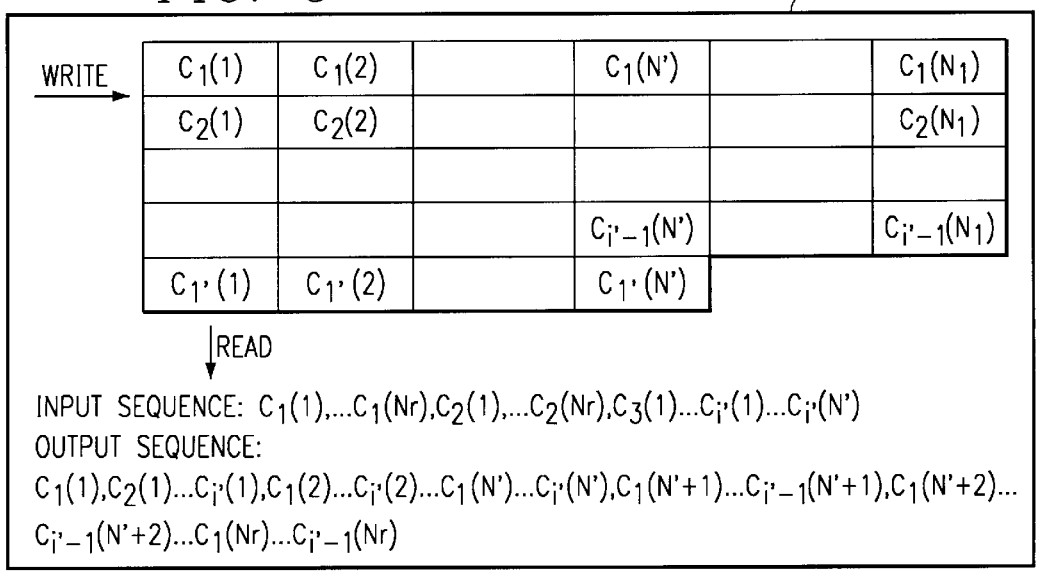
FIG. 6 depicts a structure for a byte interleaver.

In an embodiment of the present invention, byte interleaving 116 may be applied after outer encoding 114, and before inner encoding 118, if applied. The byte interleaver 116 of FIG. 1 preferably comprises a block interleaver, shown in more detail in FIG. 6. In this example, the interleaver 116 is written row-wise and read column-wise. The preferred input and output sequence are illustrated in FIG. 6.

If the outer code is a block code and the interleaver 116 is a block interleaver (dynamic or regular), an interleaver width (number of columns) equal to the codeword length is preferred, for example. The interleaver maximal depth is determined by trade-off between the burst protection and memory resources in the transmitting and receiving stations. When a dynamic block interleaver 116 is used, actual interleaving depth is determined by the packet length in a similar manner as in the dynamic interleaver described in U.S. Pat. No. 6,337,642, filed on Dec. 28, 1999 by Ariel Yagil, entitled "A Method for Efficient Interleaving of Variable Length Packets with Maximized Block Size." In a preferred embodiment of the invention, the outer code is RS (k=118, T=5, n=128) and the interleaver is a dynamic block interleaver, as examples, Therefore, the preferred interleaver width is 128, and the preferred interleaver depth is chosen to be 8, as example.

The byte interleaver 116 spreads consecutive erroneous bytes at the input of the receiver outer code decoder 214, thus increasing the robustness against events such as channel burst noise, DFE error propagation and others.

The pre-equalizer or precoder 124 allows compensation for the channel ISI at the transmitter 100 output. This allows more robust operation, faster acquisition, and fewer errors due to error propagation at the receiver DFE. This especially critical when inner coding is used, since in this case the symbol error rate at the slicer 219 output is high, and DFE operation is unreliable due to error propagation.

Because the channels between each pair of stations is different, a different set of coefficients is required for each recipient. Therefore, a bank of numerous, e.g., preferably 16 or more, sets of pre-equalizer coefficients will be stored in the modem memory. The structure of the pre-equalizer 124 is preferably a linear filter, a Tomlinson-Harashima precoder or other precoder, e.g. v.34 a.k.a Laroia precoder, as examples. The coefficient values may be determined in the rate negotiation process between each pair of modems or by other methods.

The present invention also provides enhancements to the MAC sub-layer of phoneline networks. Most of the enhancements are achieved by using a network manager 404, shown in FIG. 4. The network manager 404 may be located in any of the stations 300 of the network 400, but is preferably located in a residential gateway 402. If no network manager 404 is detected by a HomePN station 300 with network management capabilities within a certain timeout, this HomePN station 300 may be adapted to become a network manager 404 after additional random delay.

The network manager 404 is adapted to manage the bandwidth resources of the network 400. This is accomplished by dividing the time axis into "time-slots". A group of time-slots may form a multi-frame. All the stations in the network (except HomePNA 2.0x stations) are synchronized to these time-slots. Each time-slot is numbered and the stations keep track of the numbering with internal counters. The network manager 404 grants time-slots to the HomePN stations 300 of the network 400. A time-slot that is granted to a certain station 300 cannot be used by other stations 300. A special mechanism is used to prevent HomePNA 2.0x stations from interrupting during these time-slots and/or overcome such events, to be described later herein. The time-slot grant is done by transmission of grant messages, called "MAP messages" from the network manager 404 to the other stations. The MAP message includes a table in which each entry is a grant of a range of time-slots to a specific station (unicast) or a group of stations (multicast). The entries may also include more information, such as the addressee, or addressees of the granted time-slots or one or more of the transmission parameters of the granted slots, as examples. The network manager 404 allows for much more efficient usage of the spectral resources and guarantees higher QoS, as described below.

Multimedia applications such as audio and video streams (and other similar applications) may require CBR or VBR transmission. In CBR transmissions, each stream transmits fixed length packets at a constant rate. The main parameters of a CBR stream are the transmission rate, the packet length and the allowed jitter in the transmission times. In VBR, the bit rate changes according to the content of the transmitted information. The main parameters of a VBR stream are the maximal transmission rate, the average transmission rate, the maximal packet length and the allowed jitter in the transmission times. Both CBR and VBR applications are latency sensitive, that is, they cannot tolerate latency greater than the allowed jitter. The present invention guarantees reliable transmission of such streams, preferably achieved by the network manager 404. This can be achieved by two alternative methods: a CBR/VBR method and an isochronous method, in accordance with the present invention.

Figure 7:
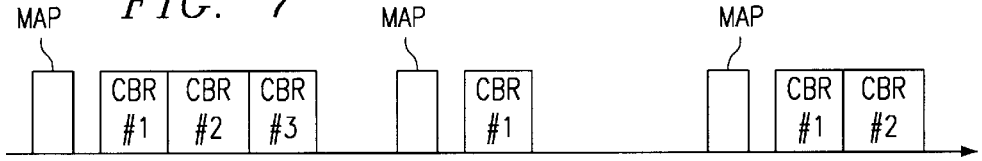
FIG. 7 depicts a Constant Bit Rate (CBR)/Variable Bit Rate (VBR) Operation transmission.

The operation of the present invention in accordance with a CBR/VBR method is illustrated in FIG. 7. The CBR/VBR method allows latency sensitive applications to transmit without collisions. The CBR/VBR method can be operated in the presence of HomePNA 2.0x stations or interfaces (I/F) 348, shown in FIG. 4. In this method, MAP messages grant time-slots to CBR/VBR transmissions.

When a CBR/VBR stream initiates, it is registered at the network manager 404 with the required parameters of the stream, such as packet rate, packet length, maximal jitter, etc., in a similar manner to a DOCSIS 1.1 service flow registration. Before the transmission time of a CBR/VBR packet, or a block of consecutive packets, the network manager 404 transmits a MAP message that grants the time intervals just after it, or a predetermined number of microseconds after the end of the MAP message. The predetermined time may be from 5–100 microseconds, e.g., 20 microseconds. The network manager message and the CBR/VBR message(s) after it are given the highest priority, so there are no collisions. If at the time of transmission of the MAP message the line is occupied, the network manager 404 waits until the end of the transmitted message. This adds a maximum of approximately 3 ms to the latency but typically, much less.

The network manager 404 typically transmits the MAP messages in 2 Mbaud and QPSK "broadcast" mode. In CBR streams the time-slots are granted without a specific request for each grant, i.e., unsolicited grants, until the stream is terminated. The network manager 404 is responsible for granting to the stream the required throughput and QoS. When the resources do not suffice, it terminates the stream. VBR streams are granted only when the station requests, i.e., solicited grant. However, unlike best-effort services, the network manager 404 is responsible for granting the request time-slots within the restrictions of the VBR stream, e.g., packet size, jitter, etc.

An alternative method to provide QoS is the isochronous method, which is not backward compatible with HomePNA 2.0x. An isochronous method operation is demonstrated in FIG. 8. For networks utilizing the present invention, isochronous transmission may be established by the network manager 404 (FIG. 4). In this method, the time axis is divided into fixed-length multi-frames, which are divided into time-slots. The multi-frame and time-slot length are preferably pre-selected, typically 10 ms and 10 $\mu$s respectively, as examples. Each CBR stream is granted one or more time-slots in each multi-frame. Each VBR stream may have reserved time-slots in each multi-frame but they are used only when they are requested by the stream. Otherwise, they are used for other services. Some of the time-slots may be used for framing and control, including MAP managing, other time-slots may be used for solicited grants, as described below, and the rest of the time-slots may be used for non-granted messages that operate in contention based method similarly to HomePNA 2.0x. The isochronous method guarantees the required bit-rate for each CBR/VBR stream with very low jitter and relatively low complexity. A MAP message may be used to activate and deactivate CBR and VBR streams, to grant time-slots to VBR streams, to grant time-slots to solicited grants (to be described further herein), to grant time-slots to contention based packets and for various control massages.

Each multi-frame preferably begins with a framing time-slot that can include network management and control messages, as well. The timing of the framing time-slot is the reference for the timing of all the time-slots in the multi-frame. Bursts of consecutive CBR streams, VBR streams or solicited messages, to be described further herein, can have shorter IFG than HomePNA 2.0x e.g., 1 µs. The priority slots and EOF can be discarded. During the contention interval, bursts are transmitted in Carrier Sense Multiple Access/Collision Detection (CSMA/CD), as in HomePNA 2.0x. However, a station must not transmit a burst that spills into the MAP-granted time-slots, or into the next multi-frame, even in the case of collision resolution. Therefore, HomePNA 2.0x stations are not compatible with this mode, because they are not aware of the locations of the MAP-granted slots.

Figure 8:
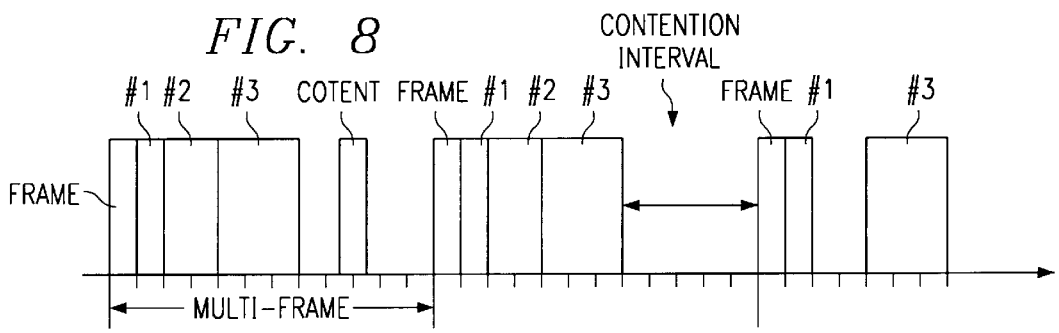
FIG. 8 depicts an isochronous method operation found in the HomePN of the present invention.

In the isochronous method illustrated in FIG. 8, there are two CBR streams (#1 and #3), one VBR stream (#2) and one contention based packet in the first multi-frame. The time-slots that are reserved for the VBR stream in the third multi-frame are not used by the stream, and are free for other service, such as contention based packets, for example.

Figure 9:
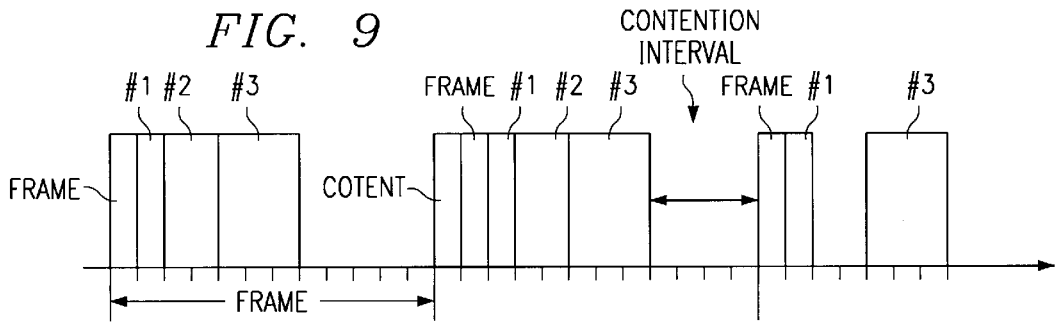
FIG. 9 depicts a quasi-isochronous method of the present invention.

In the presence of HomePNA 2.0x stations, a quasi-isochronous method can be used, as shown in FIG. 9. In this method, each multi-frame contains isochronous intervals for home networking stations of the present invention, and a contention interval that may be used by other stations, as in the isochronous method. However, because HomePNA 2.0x devices are not aware of the multi-frame boundaries, they might "spill" into the granted slots of the next multi-frame for up to approximately 3 ms, typically much less. In this case, next multi-frame's isochronous intervals would be delayed, and the contention interval would be shortened, so the next multi-frame starts without a delay and the overall multi-frame rate is maintained.

When a few granted bursts are transmitted consecutively, the Inter-Frame Gap (IFG) may be shortened because the transmission time is determined by the MAP message, not the carrier sense. Additionally, the backoff signal slots, the priority slots and EOF delimiter may be discarded. Also, the header symbols may be transmitted in high symbol rate and high constellations and the preamble may be shortened. All these allow a significant reduction in the system overhead. When a block of consecutive MAP-granted packets is transmitted, a HomePNA 2.0x header may be added at the beginning of the block and EOF delimiter may be added at the end of the block. HomePNA 2.0x stations regard the block as one long message. Therefore, HomePNA 2.0x stations will have no transmission opportunities during the transmission of this block. It is the responsibility of the Network Manager to guarantee the required QoS for HomePNA 2.0x stations.

Another MAC improvement of the present invention is support of operation of HomePN stations 300 adapted to operate with low computation power measured in Mega Instructions Per Second (MIPS), and also the support of operation of HomePN stations 300 adapted to operate with low power consumption. Low MIPS stations 300 may comprise, as examples, stations 300 with low-cost programmable Digital Signal Processors (DSPs) for low-end solutions. In these stations 300, the packet processing time is longer than the packet transmission time. Therefore, these stations 300 can handle relatively low throughput. For example, if the time needed for a station to process a packet is five times the duration of the packet, the station can only process 20% of the channel maximal traffic. Therefore, it is desirable that these stations would process only packets that are relevant to them. It is also desirable that these stations 300 will need to do minimal amount of computation.

Low power consumption stations 300 are, as examples, stations 300 that are powered through the phone line 406 (of FIG. 4) or by batteries. It is desirable that these packets would be in shutdown mode most of the time, and would be activated only when they transmit or receive a packet addressed to them.

For both cases, the network manager 404 may transmit MAP messages in predetermined times to the low MIPS/low power stations 300, preferably in a periodical manner (e.g. every 1–100 milliseconds). In the isochronous method, these messages can be transmitted in the framing slot of the multi-frames (or every n-th multi-frame). The MAP messages would inform the stations 300 at what time they should expect to receive a message and at what times they are granted transmission opportunities. When any station 300 in the network 400 (of FIG. 4) desires to send a packet to a low MIPS/low power station 300, it sends a request to the network manager 404. The MAP message informs both the transmitting and the receiving stations 300 of the correct transmission time. In this manner, low MIPS/low power stations 300 receivers 200 do not have to process the incoming signal from the phone line, except during the predetermined MAP messages, the times they are receiving packets that are addressed to them and the times that they are transmitting a packet. This method can save a significant amount of computation and reduce the dissipated power.

Another feature of the present invention is solicited grants. Solicited grants allow services that are not CBR and VBR, such as best-effort services and Available-Bit-Rate (ABR) services, as examples, to be granted time-slots by the network manager 404 using the MAP message instead of being transmitted in a contention-based mode. When a packet of such service needs to be transmitted, a short request message is transmitted from the requesting station 303 to the network manager 404. The request messages may be transmitted during the contention time-slots, in time slots specifically allocated for request messages or be piggy-backed on data messages, as examples. The request message includes the transmitting station ID, such as MAC address, for example, and the length of the requested channel resources in bytes or time-slots or other unit. Additionally, the request message may comprise other information, such as the message priority, the station's 300 capabilities or the ID of the receiving station 300 of the granted time-slots, as examples. When the network manager receives a request, it grants time-slots for the transmission of the requested packet. After granting the time-slots, the grant details are included in a MAP message. Upon receiving of the MAP message, the requesting station 300 transmits the packet during the allocated time-slots.

The solicited grant feature of the present invention allows for transmitting non-CBR/VBR messages in MAP granted time-slots. This is advantageous in several aspects. First, the packet transmission is without contention so there is no risk of a collision. Second, MAP granted messages can better exploit some of the improved PHY features of the present invention, such as ISI-free pulse shape, for example. Third, if MAP messages are transmitted predetermined times and include the ID of the receiving stations, low MIPS/low power stations 300 can request solicited grants.

Another feature of the present invention includes Data Encryption Standard (DES) and triple DES capability. The encryption will preferably be only on the data, when the source MAC addresses and the destination MAC address specify the key. The keys are entered by the management system using Rivest, Shamir & Andelamn (RSA) public key encryption technology standard, for example.

Most of the features of the HomePN devices 100/200/300 and network 400 described herein are suitable for any home phone line network. However, when the network is isolated from the Internet backbone 332 or PSTN by a network manager 404, the present invention is adapted to take advantage of the isolation. The current HomePNA standards 1.0 and 2.0 were designed for home phone line networks that are connected to a PSTN central office. This imposed many restrictions on the spectral mask and the transmission power, in order not to interfere with other services such as ADSL and amateur radio.

When homes are connected to a central office through a residential gateway, also referred to as a Broadband Telephony Interface (BTI), via a phone line or CATV network, the phone line wires within the home can be isolated from the external world. This allows the in-house phone line wires to use a wider bandwidth and allows for a higher power to be used. Some of the PHY features of the improved home networking system of the present invention utilize extended spectral bands, increased transmission power and other relaxations of restrictions that are not required in an isolated network. However, most of the features of the present invention are also suitable for networks that are connected to the PSTN.

The present invention achieves technical advantages as an improved home networking transmitting device 100, receiving device 200, HomePN device 300, network manager 404, network 400 and method. The home networking devices 100/200/300/404 and network 400 described herein may utilize PHY improvements, such as extended spectral bands, increased transmission power, higher constellations or others. Some of the improvements exploit the relaxation of restrictions on the transmission spectral mask in networks that are isolated from the PSTN. Advantages in the PHY layer also include numerous higher symbol rates, variable power level, error correcting codes, byte interleaving, ISI-free pulse shape and pre-equalization. The present invention also provides improved MAC layer services to allow high QoS for latency sensitive applications, to provide more efficient utilization of the channel and to support stations with computation power limitations and/or power limitations. Advantages in the MAC layer also include managed bandwidth resources allocation, guaranteed quality of service for latency-sensitive applications, solicited grants, support to devices with low power consumption and support to device with low processing power. The above features provide a significant improvement in the home network throughput, robustness and QoS. Therefore, it allows home networks to support applications that require higher throughput and better QoS, such as audio, video, games, client/server, distributed computing and transmissions of audio, video, gaming and future applications.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. In addition, the order of process steps may be rearranged by one of ordinary skill in the art, yet still be within the scope of the present invention. It is therefore intended that the appended claims encompass any such modifications or embodiments. Moreover, the scope of the present application is not intended to be limited to the particular embodiments of the process, machine, manufacture, composition of matter, means, methods and steps described in the specification. Accordingly, the appended claims are intended to include within their scope such processes, machines, manufacture, compositions of matter, means, methods, or steps.

What is claimed is:

1. A home networking station coupleable to a device, comprising:
    a HomePN receiver;
    a network manager for allocating channel resources to a device within the network; and
    a HomePN transmitter coupled to the receiver, the home networking station networking the device to at least one device over phone lines in a home, the transmitter communicating with the network manager.

2. The home networking station according to claim 1, wherein the network manager resides in a residential gateway.

3. A transmitter coupleable to a device, comprising:
    a HomePN transmitter adapted to network the device to at least one other device over phone lines in a home at greater than 4 Mbaud;
    a modulator adapted to support the greater than 4 Mbaud rate;
    an encoder coupled to the modulator; the encoder comprise:
        an outer encoder;
        a pre-equalizer or precoder coupled to the modulator;
        a constellation encoder coupled to the pre-equalizer or precoder;
        a symbol interleaver coupled to the constellation encoder;
        an inner encoder coupled to the symbol interleaver;
        a byte interleaver coupled to the inner encoder, the byte interleaver coupled to the outer encoder;
        a scrambler coupled to the outer encoder; and
        a framer coupled to the scrambler.

4. A transmitter coupleable to a device, comprising:
    a HomePN transmitter for networking the device to at least one other device over phone lines in a home, the HomePN transmitter including a concatenation of two error correction encoders;
    a byte interleaver coupled between the two error correction encoders; and
    a symbol interleaver coupled to the inner encoder.

5. The transmitter according to claim 4, further comprising a constellation encoder adapted to support constellations greater than 8 bits per symbol; a modulator adapted to support the greater than 8 bits per symbol constellations coupled to the constellation encoder; and a Reed-Solomon error-correcting encoder coupled to the modulator.

6. A receiver coupleable ot a device, comprising a HomePN receiver adapted t network the device to at least one other device over phone lines in the home at greater than 4 Mbaud rate; the receiver further comprising:
- a demodulator adapted to support the greater than 4 Mbaud rate;
- an Reed-Solomon code error-correcting outer decoder;
- an equalizer coupled to the demodulator;
- a symbol de-interleaver coupled to the equalizer;
- a slicer coupled to the symbol de-interleaver, the slicer coupled to the equalizer in a feedback loop;
- an inner decoder coupled to the slicer;
- a byte de-interleaver coupled to the slicer, the byte de-interleaver coupled to the outer decoder;
- a descrambler coupled to the outer decoder; and
- a de-framer coupled to the descrambler.

7. A home networking station coupleable to a device, comprising:
- a HomePN transmitter; and
- a HomePN receiver coupled to the HomePN transmitter, the Home PN transmitter and receiver being adapted to network the device to at least one other device over phone lines in a home at greater than 5 Mbaud;
- the HomePN transmitter and receiver being further adapted to operate at a low power consumption mode by shutting down modules within the device by utilizing predetermined MAP message transmission times.

8. The station according to claim 7, wherein the predetermined times are periodical.

9. The station according to claim 8, wherein the predetermined periodical times comprise from 1–100 milliseconds.

10. A home networking station coupleable to a device, comprising:
- a HomePN transmitter; and
- a HomePN receiver coupled to the HomePN transmitter, the Home PN transmitter and receiver being adapted to network the device to at least one other device over phone lines in a home at greater than 5 Mbaud;
- the HomePN transmitter and receiver being adapted to operate in a low processing power mode, wherein only a portion of the received transmissions are processed utilizing predetermined MAP message times.

* * * * *